United States Patent
Förster

(10) Patent No.: US 9,267,607 B2
(45) Date of Patent: Feb. 23, 2016

(54) ACTUATOR FOR AN ADJUSTABLE DAMPER-VALVE DEVICE

(75) Inventor: Andreas Förster, Schweinfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 275 days.

(21) Appl. No.: 13/991,314

(22) PCT Filed: Oct. 24, 2011

(86) PCT No.: PCT/EP2011/068504
§ 371 (c)(1),
(2), (4) Date: Jun. 3, 2013

(87) PCT Pub. No.: WO2012/072338
PCT Pub. Date: Jun. 7, 2012

(65) Prior Publication Data
US 2013/0248021 A1 Sep. 26, 2013

(30) Foreign Application Priority Data
Dec. 1, 2010 (DE) .......... 10 2010 062 262

(51) Int. Cl.
*F16K 31/06* (2006.01)
*F16K 17/06* (2006.01)
*F16F 9/46* (2006.01)

(52) U.S. Cl.
CPC .......... *F16K 17/06* (2013.01); *F16F 9/464* (2013.01); *F16K 31/0655* (2013.01); *F16F 2226/045* (2013.01); *Y10T 137/7905* (2015.04); *Y10T 137/7922* (2015.04)

(58) Field of Classification Search
CPC ...... F16F 9/464; F16F 2226/045; F16K 17/06
USPC .............. 251/129.02, 129.18, 129.1, 129.185
See application file for complete search history.

(56) References Cited

U.S. PATENT DOCUMENTS

| | | | |
|---|---|---|---|
| 2,698,159 A * | 12/1954 | Crum | 251/129.19 |
| 3,977,649 A | 8/1976 | Zeuner | |
| 4,002,318 A | 1/1977 | von Koch | |
| 5,301,776 A | 4/1994 | Beck | |
| 5,603,483 A * | 2/1997 | Reuter et al. | 251/129.02 |
| 5,605,173 A * | 2/1997 | Arnaud | 137/7 |
| 5,890,662 A * | 4/1999 | Dykstra | 239/585.1 |
| 6,145,809 A | 11/2000 | Förster | |
| 7,946,274 B2 * | 5/2011 | Hayatani et al. | 123/467 |
| 8,418,723 B2 * | 4/2013 | Tsuchiya et al. | 137/625.65 |
| 8,485,224 B2 * | 7/2013 | Forster | 137/614.11 |
| 8,979,067 B2 * | 3/2015 | Dinerman et al. | 251/153 |

(Continued)

FOREIGN PATENT DOCUMENTS

DE 102007022059 A1 12/2008
WO WO 2009059845 A1 * 5/2009

*Primary Examiner* — Marina Tietjen
*Assistant Examiner* — Seth W Mackay-Smith
(74) *Attorney, Agent, or Firm* — Cozen O'Connor

(57) ABSTRACT

An actuator for an adjustable damping valve device includes an armature which has an axial valve stem. At least one spring loads the armature in a direction opposite to the magnetic armature force generated by a magnetic coil. The position of the valve stem is adjustable with respect to a defined valve position of the damping valve device. The spring loading the armature is supported at a spring bearing which is accessible via a housing wall of the actuator and which can be adjusted with respect to its axial position.

6 Claims, 2 Drawing Sheets

(56) References Cited

U.S. PATENT DOCUMENTS

2007/0164244 A1* 7/2007 Kratzer .................... 251/129.07
2009/0050829 A1* 2/2009 Haynes et al. ........... 251/129.02
2010/0051839 A1* 3/2010 Guggenmos et al. .... 251/129.02
2010/0264342 A1* 10/2010 Heyer et al. .............. 251/129.15

* cited by examiner

ACTUATOR FOR AN ADJUSTABLE DAMPER-VALVE DEVICE

PRIORITY CLAIM

This is a U.S. national stage of application No. PCT/EP2011/068504, filed on Oct. 24, 2011. Priority is claimed on the following application(s): Country: Germany, Application No.: 102010062262.1, Filed: Dec. 1, 2010, the content of which is incorporated herein by reference.

FIELD OF THE INVENTION

The invention is directed to an actuator for an adjustable damping valve device.

An actuator for an electromagnetically adjustable damping valve is known from DE 198 46 543 A1. The armature of the actuator is adjustable in the course of manufacture so as to substantially compensate for manufacturing deviations. The armature has a slide on which an armature assembly is fixed. In order to adjust the armature, the slide is moved into a defined position and held there. Subsequently, the armature assembly is moved axially on the slide until reaching a position defined by a stop. This position is permanently fixed. A radial bead or a tolerance sleeve which exerts an axial retaining force between the slide and the armature assembly by means of an interference fit can be used for this purpose.

It is evident from the drawings that the adjusting method described in DE 198 46 543 A1 for adjusting the actuator is only possible when the relevant component parts are also easily accessible.

It is thus an object of the present invention to provide an actuator for an adjustable damping valve which is also adjustable in an enclosed type of construction.

SUMMARY OF THE INVENTION

This object is met in that the spring loading the armature is supported at a spring bearing which is accessible via a housing wall of the actuator and which can be adjusted with respect to its axial position. The position of the armature is determined by the position of the spring bearing.

The position of the armature can be adjusted even when the actuator housing is closed because the adjusting device is accessible. Consequently, the adjustment of the armature can be carried out at a relatively late stage of manufacture.

In a further advantageous embodiment, the spring bearing is formed by a sleeve which is guided in the housing wall. The adjusting device can be reached easily and there is no need to reach deep into the interior of the housing.

The sleeve is constructed as a clamping sleeve as the simplest possible adjusting tool for the spring bearing.

The spring is supported at the housing wall in a preassembly position so as to achieve a starting position of the armature which can be defined in the simplest possible manner.

According to an advantageous embodiment, the housing wall is formed by a cover. With a cover as separate component of the actuator housing, the position of the spring bearing can be monitored very easily before the cover is fitted.

It is provided that the length of the sleeve is greater than the wall thickness of the housing wall. Therefore, in the preassembly position the spring bearing projects axially outward relative to the housing wall, providing a good tool access.

For purposes of a simple overall construction of the actuator and the greatest possible spacing of the bearing points of the valve lifter, the spring bearing supports the valve lifter radially so that the spring bearing exercises multiple functions.

BRIEF DESCRIPTION OF THE DRAWINGS

The invention will be described in more detail below with reference to the following drawings in which.

DETAILED DESCRIPTION OF THE PRESENTLY PREFERRED EMBODIMENTS

Figure 1:
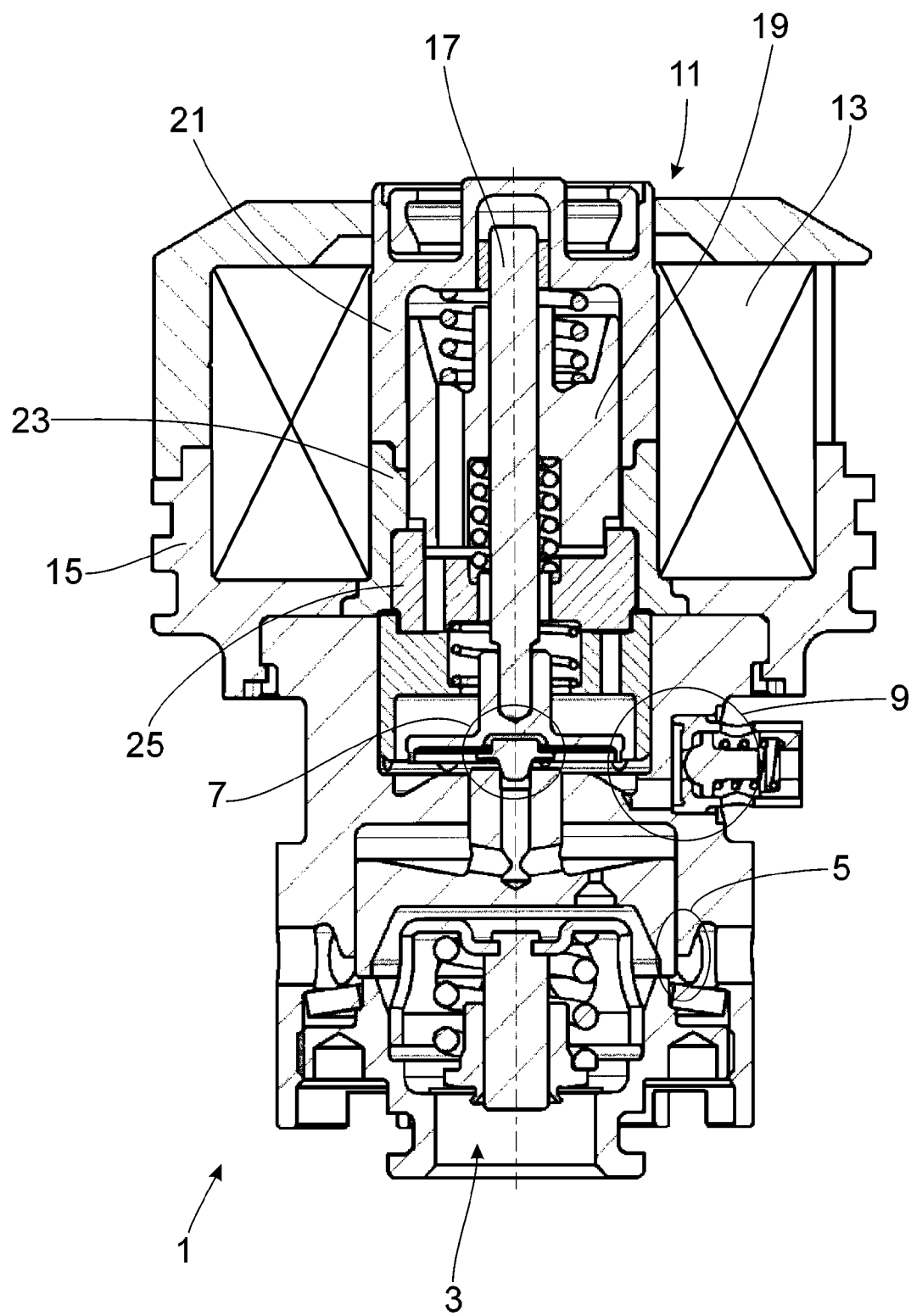
FIG. 1 is a sectional view through an adjustable damping valve device.

FIG. 1 shows an adjustable damping valve device 1 comprising a pilot valve 3, a main stage valve 5, an auxiliary valve 7 and an emergency operation valve 9. In principle, the adjustable damping valve device 1 can also be configured differently.

The adjusting function is carried out by an actuator 11 which is controlled by a magnetic coil 13 which is arranged in a housing 15 of the damping valve device 1. The actuator 11 comprises a bolt-like valve stem 17 to which an armature 19 is fixed. The armature 19 is received by a cup-shaped magnetic reflow body 21 which is connected to a magnetically conducting pole disk 25 by a magnetically nonconductive insulator 23. With respect to the armature 19, the return path body 21, the insulator 23 and the pole disk 25, as cover, form a housing 27.

The armature 19 is clamped by a first spring 29 and a second spring 31 between the base 33 of the magnetic reflow body 21 and the pole disk 25. In principle, a single spring directed against the force of the coil 13 would be sufficient for the operation of the actuator 11.

The first spring 29 is supported at a spring bearing 35 which is arranged at a through-opening of the wall of the housing 27, namely the cover or pole disk 25. The spring bearing 35 is formed by a sleeve which in this embodiment has a greater length than the wall thickness of the housing wall or the pole disk 25. The sleeve is constructed as a clamping sleeve and can be adjusted with respect to its axial length inside the pole disk 25.

The central valve stem 17 is radially supported by a bearing sleeve 37 or directly in the base 33 of the magnetic reflow body 21. The spring bearing 35 forms a second bearing sleeve for the valve stem 17.

Figure 2:
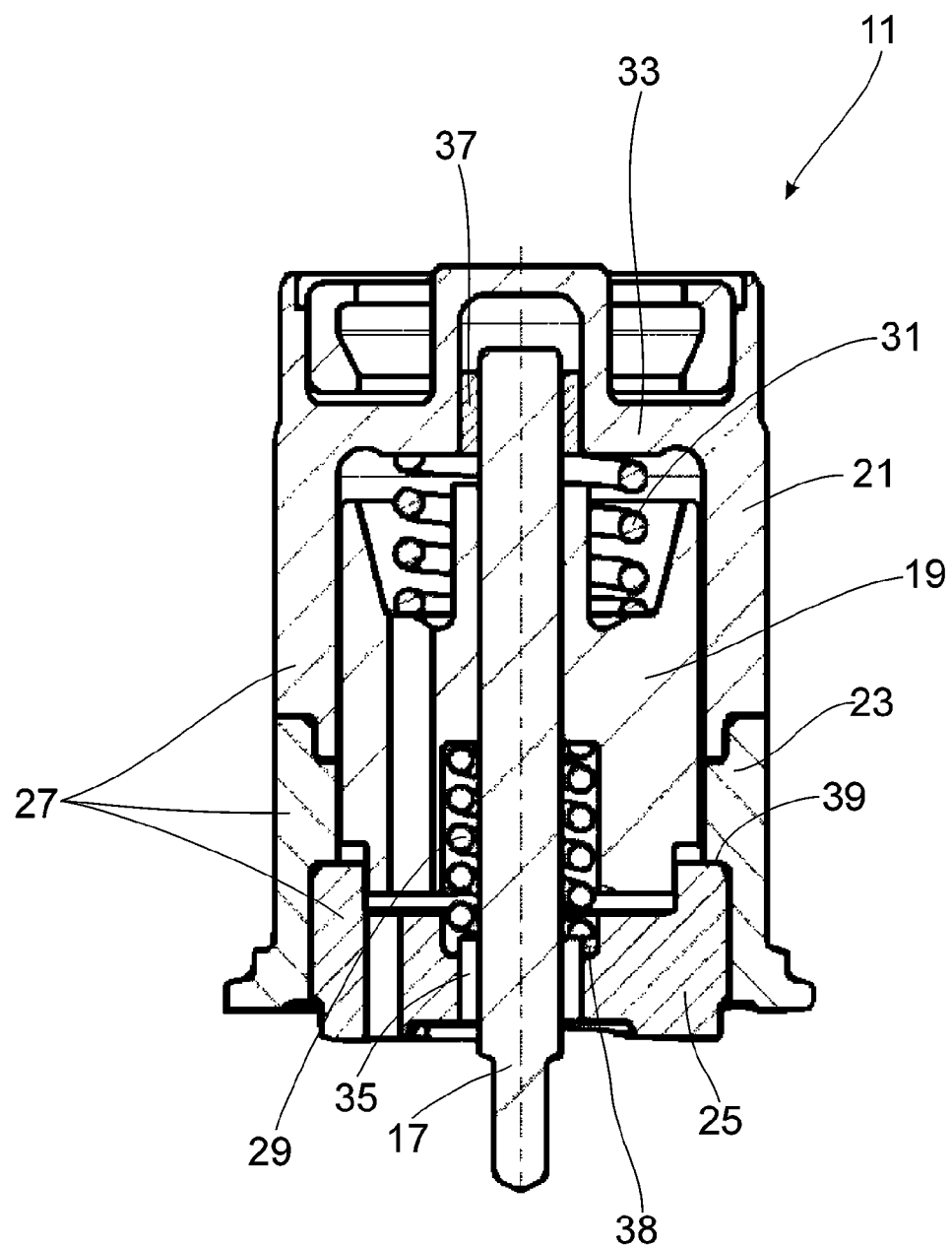
FIG. 2 is a detail of the actuator from FIG. 1.

For assembly, the armature 19 is pressed onto the valve stem 17 until the position shown in FIG. 2 is reached. In a parallel work step, the bearing sleeve 37 is pressed into the base 33 of the magnetic reflow body 21. Additionally, the insulator 23 is connected to the magnetic reflow body 21. The spring bearing 35 or sleeve is pressed into the pole disk 25. In so doing, it must be ensured that the sleeve terminates flush with the side of the pole disk facing in direction of the armature 19 to the maximum extent but in no case extends beyond a spring supporting surface 38. Owing to the greater length of the spring bearing 35 compared to the wall of the pole disk 25, the spring bearing projects outward and can be accessed by an adjustment tool.

Subsequently, the second spring 31, the armature 19 with the valve stem 17 and the first spring 29 are inserted into the magnetic reflow body 21. In a further work step, the pole disk 25 is threaded onto the valve stem 17 until the pole disk 25 contacts a shoulder 39 of the insulator 23. A permanent fastening of the pole disk is achieved, for example, by crimping at the edge of the insulator 23 toward the pole disk 25. There is now a closed constructional unit in a preassembly state which is adjusted prior to inserting into the damping valve device 1. In so doing, the first spring 29 is supported directly on the inner side of the pole disk 25 on the spring supporting surface 38.

The constructional unit according to FIG. 2 is then outfitted with a magnetic coil, not shown, and an outer return path element. In a first method step, a defined magnetic force is applied to the armature 19 so that the valve stem 17 has a maximum projecting length relative to the outer side of the pole disk 25. This position serves as reference value. A magnetic force is then generated by a defined electric current to bring about a second operating point of the adjustable damping valve device 1. This second operating point can correspond, e.g., to magnetic force=0 newton or to some other value, where the magnetic force represents a determined current strength. The adjusting path of the valve stem 17 relative to the reference point is measured at the second operating point. In so doing, the dimensioning of the preloading of the first spring and/or the axial installation space thereof ensures that the required adjusting path of the valve stem relative to the reference point is not achieved. While retaining the defined magnetic force setting of the second operating point, a tool is now inserted by which the spring bearing 35 in the pole disk 25 is displaced axially in the direction of the armature 19. The first spring 29 is now only supported at the spring bearing 35. Accordingly, the two springs 29; 31 are preloaded to a greater extent and the valve stem 17 occupies the predetermined lift position relative to the first reference point. The preloading of the springs 29; 31 is maintained over the entire operating period of the actuator 11 as a result of the frictional force between the spring bearing 35 and the pole disk 25. Alternatively, the spring bearing 35 can also be constructed as a screw sleeve, and the process is carried out in identical fashion in other respects.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuator for an adjustable damping valve device comprising:
   A housing (27) including a housing wall having an aperture;
   an armature (19);
   an axial valve stem (17) extending through said aperture in said housing wall;
   a spring bearing (35) and at least one spring (29) loading said armature (19) in a direction opposite to the magnetic armature force generated by a magnetic coil (13); the position of said valve stem (17) being adjustable with respect to a defined valve position of the damping valve device; and
   wherein said spring (29) loading said armature (19) is supported at said spring bearing (35), said spring bearing being accessible via said housing wall of said actuator (11) and adjustable with respect to its axial position;
   wherein said spring (29) is in contact with and supported at the housing wall in a preassembly position, wherein the housing wall is closing off a lower part of the housing so that the spring (29) and the armature (19) are enclosed by the housing; said spring having a diameter that is greater than the diameter of the aperture in the housing wall; and
   wherein, in an end assembly portion, the spring is lifted off the housing wall by inserting the spring bearing (35) through the aperture in the housing wall so as to load said armature (19) in the direction opposite to the magnetic armature force generated by the magnetic coil (13).

2. The actuator according to claim 1, wherein said spring bearing (35) is formed by a sleeve guided in said housing wall.

3. The actuator according to claim 2, wherein said sleeve is constructed as a clamping sleeve.

4. The actuator according to claim 1, wherein said housing wall is formed by a cover.

5. The actuator according to claim 2, wherein said sleeve has a length and said length of said sleeve is being greater than the wall thickness of said housing wall.

6. The actuator according to claim 1, wherein said spring bearing (35) radially supports said valve stem (17).

\* \* \* \* \*